United States Patent
Marsan et al.

(10) Patent No.: US 11,902,019 B2
(45) Date of Patent: Feb. 13, 2024

(54) OPTIMIZED LINK ADAPTION

(71) Applicant: NOKIA SOLUTIONS AND NETWORKS OY, Espoo (FI)

(72) Inventors: Mark Marsan, Elmhurst, IL (US); Xun Fan, Jiangsu (CN); Lei Shi, Jiangsu (CN)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 406 days.

(21) Appl. No.: 17/418,006

(22) PCT Filed: Dec. 24, 2018

(86) PCT No.: PCT/CN2018/122990
§ 371 (c)(1),
(2) Date: Jun. 24, 2021

(87) PCT Pub. No.: WO2020/132780
PCT Pub. Date: Jul. 2, 2020

(65) Prior Publication Data
US 2022/0069939 A1 Mar. 3, 2022

(51) Int. Cl.
*H04L 1/00* (2006.01)
*H04L 1/20* (2006.01)

(52) U.S. Cl.
CPC .......... *H04L 1/0013* (2013.01); *H04L 1/0003* (2013.01); *H04L 1/0026* (2013.01); *H04L 1/203* (2013.01)

(58) Field of Classification Search
None
See application file for complete search history.

(56) References Cited

U.S. PATENT DOCUMENTS 8,929,239 B2    1/2015  Tabet et al.
2013/0310092 A1* 11/2013  Tabet ............... H04L 1/0003
                                                      455/501

(Continued)

FOREIGN PATENT DOCUMENTS

CN          102577201 A      7/2012
WO    WO-2015165514 A1 * 11/2015  ........... H04L 1/0031
WO    WO-2018070910 A1 *  4/2018  ........... H04B 17/309

OTHER PUBLICATIONS

Delgado Ramon A et al: "Fast Convergence Outer Loop Link Adaption with Infrequent Updates in Steady State", 2017 IEEE 86th Vehicular Technology Conference (VTC-Fall), IEEE, Sep. 24, 2017, pp. 1-5.

(Continued)

*Primary Examiner* — Anh H Ly
(74) *Attorney, Agent, or Firm* — SQUIRE PATTON BOGGS (US) LLP

(57) ABSTRACT

A method, a device and a computer readable media for communication are disclosed. The method (200) comprises determining, based on a target error rate between a first device and a second device, a code rate for transmitting data from the second device to the first device (210). The method also comprises adjusting the code rate based on an amount of the data and an amount of resource available for transmitting the data (220). The method further comprises updating the target error rate for transmitting subsequent data from the second device to the first device based on an amount of the adjustment of the code rate (230). An improved link adaption scheme and improve uplink/downlink transmission performance of the communication system are provided.

23 Claims, 4 Drawing Sheets

(56) References Cited

U.S. PATENT DOCUMENTS

| | | |
|---|---|---|
| 2014/0124709 A1 | 5/2014 | Zheng et al. |
| 2014/0254649 A1 | 9/2014 | Afkhami et al. |
| 2015/0091742 A1 | 4/2015 | Ionita et al. |
| 2015/0188663 A1 | 7/2015 | Park et al. |
| 2017/0142696 A1 | 5/2017 | Kim et al. |
| 2018/0026742 A1* | 1/2018 | Mirzaee ................ H04L 1/0021 370/329 |
| 2018/0123772 A1* | 5/2018 | Wang .................... H04L 5/1461 |
| 2019/0036829 A1* | 1/2019 | Ji .......................... H04B 17/336 |
| 2019/0097750 A1* | 3/2019 | Sandberg ............. H04L 1/0035 |
| 2019/0238242 A1* | 8/2019 | Middleton ............ H04L 1/0001 |

OTHER PUBLICATIONS

Extended Search Report dated Jul. 18, 2022, corresponding to European Patent Application No. 18944909.3.
International Search Report and Written Opinion dated Sep. 24, 2019, corresponding to International Patent Application No. PCT/CN2018/122990.

* cited by examiner

OPTIMIZED LINK ADAPTION

FIELD

Embodiments of the present disclosure generally relate to wireless communication, and in particular, to an improved link adaption scheme for uplink/downlink transmissions.

BACKGROUND

Link adaptation (LA) is a key feature for the uplink of long-term evolution (LTE) and its subsequent evolution systems. In performing the LA, a network device selects an appropriate modulation and coding scheme (MCS) for uplink transmission according to a measured uplink channel quality, such as a measured Signal to Noise Ratio (SNR). In order to overcome non-ideal measurements and channel conditions, the outer loop link adaptation (OLLA) algorithm may be used. With the OLLA, the network device may modify the measured SNR, according to whether the transmitted data packets are received correctly or not, in order to adjust the average block error rate (BLER) to a preset target BLER.

However, conventional LA schemes are only able to operate with a fixed target error rate, for example, a preset target BLER. In various communication scenarios, a variable target error rate instead of a fixed target error rate may be desirable for better performance of communication. Operated with a fixed target error rate, the conventional LA schemes are incompatible with these communication scenarios aimed for a variable target error rate. Accordingly, there is a need for an improved link adaption scheme which is capable of working with a variable target error rate.

SUMMARY

In general, example embodiments of the present disclosure provide a method, a device and a computer readable media for communication.

In a first aspect, there is provided a method. The method comprises determining, based on a target error rate between a first device and a second device, a code rate for transmitting data from the second device to the first device. The method also comprises adjusting the code rate based on an amount of the data and an amount of resource available for transmitting the data. The method further comprises updating the target error rate for transmitting subsequent data from the second device to the first device based on an amount of the adjustment of the code rate.

In a second aspect, there is provided a device. The device comprises at least one processor and at least one memory storing computer program code. The at least one memory and the computer program code are configured to, with the at least one processor, cause the device to determine, based on a target error rate between the device and a further device, a code rate for transmitting data from the further device to the device. The at least one memory and the computer program code are also configured to, with the at least one processor, cause the device to adjust the code rate based on an amount of the data and an amount of resource available for transmitting the data. The at least one memory and the computer program code are further configured to, with the at least one processor, cause the device to update the target error rate for transmitting subsequent data from the further device to the device based on an amount of the adjustment of the code rate.

In a third aspect, there is provided a computer readable medium having instructions stored thereon. The instructions, when executed on at least one processor of a device, cause the device to carry out the method according to the first aspect.

It is to be understood that the summary section is not intended to identify key or essential features of embodiments of the present disclosure, nor is it intended to be used to limit the scope of the present disclosure. Other features of the present disclosure will become easily comprehensible through the following description.

BRIEF DESCRIPTION OF THE DRAWINGS

Through the more detailed description of some embodiments of the present disclosure in the accompanying drawings, the above and other objects, features and advantages of the present disclosure will become more apparent, wherein.

Throughout the drawings, the same or similar reference numerals represent the same or similar elements.

DETAILED DESCRIPTION OF EMBODIMENTS

Figure 1:
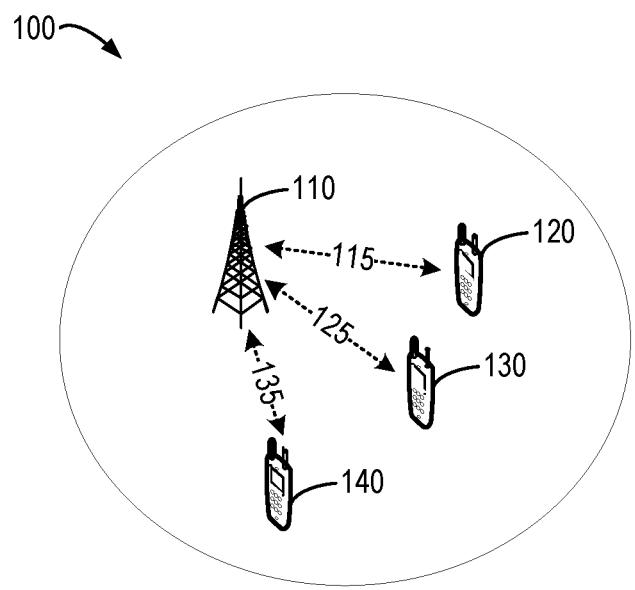
FIG. 1 is a schematic diagram of a communication environment in which embodiments of the present disclosure can be implemented.

Principle of the present disclosure will now be described with reference to some example embodiments. It is to be understood that these embodiments are described only for the purpose of illustration and help those skilled in the art to understand and implement the present disclosure, without suggesting any limitations as to the scope of the disclosure. The disclosure described herein can be implemented in various manners other than the ones described below.

In the following description and claims, unless defined otherwise, all technical and scientific terms used herein have the same meaning as commonly understood by one of ordinary skills in the art to which this disclosure belongs.

References in the present disclosure to "one embodiment," "an embodiment," "an example embodiment," and the like indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

It shall be understood that although the terms "first" and "second" and so on may be used herein to describe various elements, these elements should not be limited by these terms. These terms are only used to distinguish one element from another. For example, a first element could be termed a second element, and similarly, a second element could be termed a first element, without departing from the scope of example embodiments. As used herein, the term "and/or" includes any and all combinations of one or more of the listed terms.

The terminology used herein is for the purpose of describing particular embodiments only and is not intended to be limiting of example embodiments. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof.

The term "circuitry" used herein may refer to one or more or all of the following: (a) hardware-only circuit implementations (such as implementations in only analog and/or digital circuitry) and (b) combinations of hardware circuits and software, such as (as applicable): (i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions) and (c) hardware circuit(s) and or processor(s), such as a microprocessor(s) or a portion of a microprocessor(s), that requires software (for example, firmware) for operation, but the software may not be present when it is not needed for operation."

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

As used herein, the term "communication network" refers to a network following any suitable communication standards, such as New Radio (NR), Long Term Evolution (LTE), LTE-Advanced (LTE-A), Wideband Code Division Multiple Access (WCDMA), High-Speed Packet Access (HSPA), Narrow Band Internet of Things (NB-IoT) and so on. In addition, the communication network may also refer to a so called Unlicensed Band Network, Licensed Band Network or MuLTEfire Network, or the like. Furthermore, the communications between a terminal device and a network device in the communication network may be performed according to any suitable generation communication protocols, including, but not limited to, the first generation (1G), the second generation (2G), 2.5G, 2.75G, the third generation (3G), the fourth generation (4G), 4.5G, the future fifth generation (5G) communication protocols, and/or any other protocols either currently known or to be developed in the future. Embodiments of the present disclosure may be applied in various communication systems. Given the rapid development in communications, there will of course also be future type communication technologies and systems with which the present disclosure may be embodied. It should not be seen as limiting the scope of the present disclosure to only the aforementioned system.

As used herein, the term "network device" refers to a node in a communication network via which a terminal device accesses the network and receives services therefrom. The network device may refer to a base station (BS) or an access point (AP), for example, a node B (NodeB or NB), an evolved NodeB (eNodeB or eNB), a NR NB (also referred to as a gNB), a Remote Radio Unit (RRU), a radio header (RH), a remote radio head (RRH), a relay, a low power node such as a femto, a pico, and so forth, depending on the applied terminology and technology.

The term "terminal device" refers to any end device that may be capable of wireless communication. By way of example rather than limitation, a terminal device may also be referred to as a communication device, user equipment (UE), a Subscriber Station (SS), a Portable Subscriber Station, a Mobile Station (MS), or an Access Terminal (AT). The terminal device may include, but not limited to, a mobile phone, a cellular phone, a smart phone, voice over IP (VoIP) phones, wireless local loop phones, a tablet, a wearable terminal device, a personal digital assistant (PDA), portable computers, desktop computer, image capture terminal devices such as digital cameras, gaming terminal devices, music storage and playback appliances, vehicle-mounted wireless terminal devices, self-driving cars, wireless endpoints, mobile stations, laptop-embedded equipment (LEE), laptop-mounted equipment (LME), USB dongles, smart devices, wireless customer-premises equipment (CPE), an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. In the following description, the terms "terminal device", "communication device", "terminal", "user equipment" and "UE" may be used interchangeably.

FIG. 1 is a schematic diagram of a communication environment 100 in which embodiments of the present disclosure can be implemented. The communication environment 100 may comprise a network device 110, which provides wireless connections for a plurality of terminal devices 120, 130, and 140 within its coverage. The terminal devices 120, 130, and 140 may communicate with the network device 110 via channels such as wireless transmission channels 115, 125, and 135, respectively. For transmissions from the network device 110 to the terminal devices 120, 130, and 140, the channels 115, 125, and 135 may be referred to as downlink channels, whereas for transmissions from the terminal devices 120, 130, and 140 to the network device 110, the channels 115, 125, and 135 may alternatively be referred to as uplink channels. Additionally, the terminal devices 120, 130, and 140 may communicate with each other via device-to-device (D2D) links (not shown in FIG. 1) or communicate with each other or towards the network device 110 via relay type links (not shown in FIG. 1).

It is to be understood that the number of network devices and the number of terminal devices as shown in FIG. 1 are only for the purpose of illustration without suggesting any limitations. The communication environment 100 may include any suitable number of network devices and any suitable number of terminal devices adapted for implementing embodiments of the present disclosure. In addition, it would be appreciated that there may be various wireless communications as well as wireline communications (if needed) among these additional network devices and additional terminal devices.

Communications in the communication environment 100 may be implemented according to any proper communication protocol(s), comprising, but not limited to, cellular communication protocols of the first generation (1G), the second generation (2G), the third generation (3G), the fourth generation (4G) and the fifth generation (5G) and on the like, wireless local network communication protocols such as Institute for Electrical and Electronics Engineers (IEEE) 802.11 and the like, and/or any other protocols currently known or to be developed in the future. Moreover, the communication may utilize any proper wireless communication technology, comprising but not limited to: Code Divided Multiple Address (CDMA), Frequency Divided Multiple Address (FDMA), Time Divided Multiple Address (TDMA), Frequency Divided Duplexer (FDD), Time Divided Duplexer (TDD), Multiple-Input Multiple-Output (MIMO), Orthogonal Frequency Divided Multiple Access (OFDMA) and/or any other technologies currently known or to be developed in the future.

As mentioned, in performing the LA, a network device selects an appropriate modulation and coding scheme (MCS) for uplink transmission according to a measured uplink channel quality, such as a measured SNR. In order to overcome non-ideal measurements and channel conditions, the OLLA algorithm may be used. With the OLLA, the network device may modify the measured SNR, according to whether the transmitted data packets are received correctly or not by the intended terminal device, in order to adjust the average block error rate (BLER) to a preset target BLER.

For example, a jumping algorithm may be used for the OLLA. Based on a hybrid automatic repeat request (HARD) result of the uplink (UL) transmission, the network device adjusts an SNR offset which is used to correct the UL channel quality measurement result, according to the equation (1) as below.

$$\Delta_{current} = \begin{cases} \Delta_{previous} - \text{StepSize} & (NACK \text{ is determined}) \\ \Delta_{previous} + \text{StepSize} \cdot \frac{BLER_{target}}{1 - BLER_{target}} & (ACK \text{ is determined}) \end{cases} \quad (1)$$

where $\Delta_{current}$ represents the offset for current transmission, the $\Delta_{previous}$ represents the offset for previous transmission, and $BLER_{target}$ represents a preset target BLER. The adjusted SNR for MCS selection is calculated as follows, where $SNR_{measure}$ represents the measured channel SNR.

$$SNR_{adjusted} = SNR_{measure} + \Delta_{current} \quad (2)$$

The target BLER will eventually be reached with the OLLA procedure.

As indicated above, conventional LA schemes are only able to operate with a fixed target error rate, for example, a preset target BLER. In various communication scenarios, a variable target error rate instead of a fixed target error rate may be desirable for better performance of communication. Operated with a fixed target error rate, the conventional LA schemes may be incompatible with these communication scenarios aimed for a variable target error rate.

As an example of the communication system in which a variable target error rate is desirable, MuLTEfire is a technology that extends LTE technology into an unlicensed spectrum. It uses Blocked Interleaved FDMA (B-IFDMA) for uplink transmission where allocations are made in units of interlaces with granularity of 10 Physical Resource Blocks (PRBs) as defined in the third generation partnership project (3GPP) specifications, and the minimum resource allocation unit is one interlace (10 PRBs). With such a big allocation granularity, the MuLTEfire has much more chance than the LTE to allocate more frequency resources (PRBs) resulting in higher UL data transmission block size than requested by the terminal device. Due to this reason, MCS reduction technology may be used to maximize the utility of UL resource. Instead of using the MCS from LA, the network device selects most robust MCS, with which the transfer block can still accommodate the data of the terminal device to be transmitted, in order to lower the latency of UL data transmission by decreasing the probability of HARQ retransmission opportunity, which results in a lower BLER level.

The LTE LA feature may be adopted by the MuLTEfire as well. However, the traditional OLLA cannot work with the MCS reduction function. Existing OLLA aims to reach a fixed preset BLER target while MCS reduction function aims to reach a variable lower BLER target, so they are incompatible. A simple solution was considered where OLLA corrections only apply in UL allocations that do not use MCS reduction (when requested UL data somehow fits perfectly into interlace allocations), but when the MCS reduction is used frequently, this greatly slows down OLLA corrections and completely eliminates OLLA corrections if MCS reduction is used continuously. Thus, a solution is needed that allows the OLLA to operate even when the MCS reduction is used continuously.

In LTE, this problem does not occur since the granularity of UL allocations is typically 1 PRB. Regarding the potential improvements in OLLA, there have been proposed some possibilities. For example, there has been proposed a faster initial OLLA algorithm where a higher set of weights is applied when an acknowledgement (ACK) or a negative acknowledgement (NACK) is determined, to allow a faster probing of the channel. Once an MCS change is needed, then the smaller weights are applied and a normal OLLA operation follows. As another example, there has presented an open loop OLLA adjustment based on metrics like UE rank.

In addition, there have been some discussions related to the basics of the OLLA-applying a channel quality indicator (CQI) offset based on ACK or NACK, which is existing art for the legacy LTE OLLA algorithm. There have also been some discussions related to using different BLER targets based on channel conditions. Presumably, additive white Gaussian noise (AWGN) channels can use a higher BLER target and faster fading channels use a lower BLER target.

However, among these conventional solutions, there is not an link adaption scheme which is capable of working with a variable target error rate, for example, allowing the OLLA to operate even when the MCS reduction is used continuously, such as in the MuLTEfire system. In view of the above, embodiments of the present disclosure provides an improved link adaption scheme which is capable of working with a variable target error rate. In some embodiments, the offset for adjusting the measured result of channel quality in the OLLA may be adjusted according to an adjusted-code-rate-oriented (such as reduced-MCS-oriented) dynamic target error rate instead of an adjusted-code-rate-unaware (such as reduced-MCS-unaware) fixed preset value. In some embodiments, the dynamic target error rate is decided by an amount of adjustment of the code rate of transmission. The network device may calculate the target error rate for each transmission standalone.

In some embodiments, the offset for adjusting the measured value of quality of the channel is adjusted according to the dynamic error rate target and a HARQ result of each transmission. In addition, a fading compensation factor may be applied to the adjustment in order to lower the contribution of ACKs and NACKs when the code rate is adjusted (such as the MCS level is reduced). The fading compensation factor mitigates the impact of derivation error between the assumed error rate and the actual error rate caused by adjustment of code rate, which varies with different wireless channel conditions and is hard to accurately be modelled in a practical system with limited number of error-rate vs code-rate-adjustment assumptions.

The proposed link adaption scheme makes the OLLA workable together with the adjustment of the code rate (such as MCS reduction function) and it improves transmission performance of the communication system. With the proposed link adaption scheme, the error rate (such as BLER) of transmission can always be controlled below expected levels corresponding to the amount of the adjustment of the code rate, such as MCS reduction level. In the following, some embodiments according to the present disclosure will be detailed with reference to FIGS. 2-6.

Figure 2:
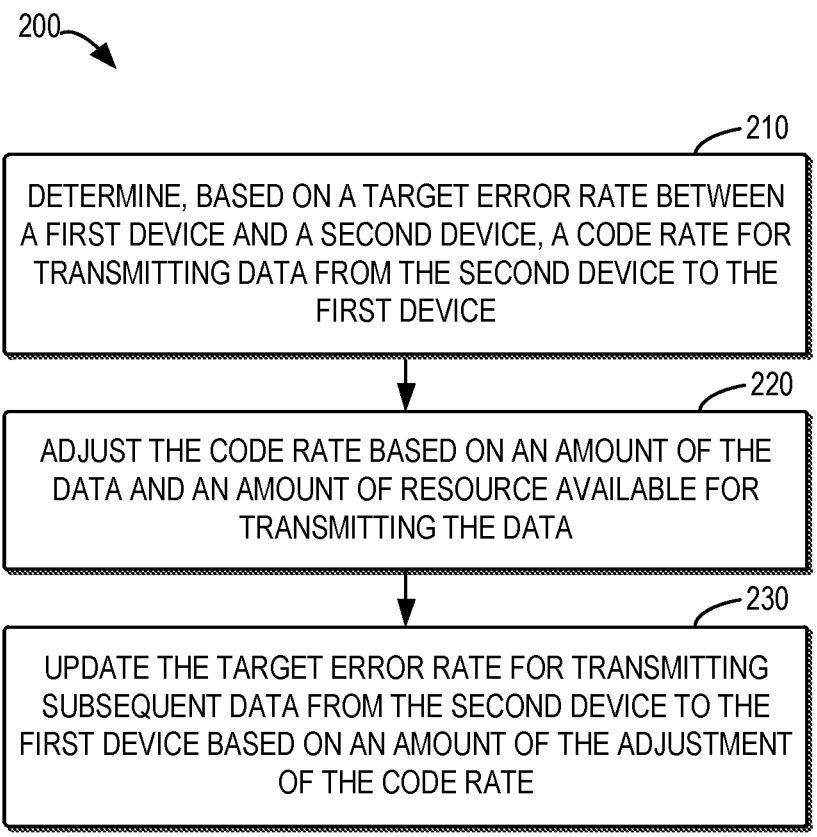
FIG. 2 shows a flowchart of an example method in accordance with some embodiments of the present disclosure.

FIG. 2 shows a flowchart of an example method 200 in accordance with some embodiments of the present disclosure. The method 200 can be implemented at a network device, such as the network device 110 as shown in FIG. 1. Alternatively, the method 200 can also be implemented at a terminal device, such as the terminal devices 120, 130, and 140 as shown in FIG. 1. For the purpose of discussion, the method 200 will be described with reference to FIG. 1 and described as being performed by the network device 110 as a first device with respect to the terminal device 120 as a second device without loss of generality.

It is understood that if the network device 110 is referred to as the first device, the second device may also be the terminal devices 130, 140 as shown in FIG. 1 or further terminal devices not shown in FIG. 1. It is also understood that the first device may also be the terminal devices 120, 130, 140 as shown in FIG. 1 or further terminal devices not shown in FIG. 1, and in this event the second device may be the network device 110 as shown in FIG. 1 or further network devices not shown in FIG. 1. In other words, the example method 200 may be used for either or both of uplink and downlink transmissions, and may be performed at either or both of a network device and a terminal device in communication with each other.

At block 210, the first device 110 determines a code rate for transmitting data from the second device 120 to the first device 110, based on a target error rate between the first device 110 and the second device 120. As mentioned above, in the communication environment 100, the first device 110 may communicate with the second device 120 via the channel such as a wireless transmission channel 115. In the communication, the first device 110 may transmit data to the second device 120. In some embodiments, the transmitted data may include any type of data, such as user data, control data, or the like, and the scope of the present disclosure is not limited in this regard. That is, the data may include any information communicated between the first device 110 and the second device 120.

In order to achieve a reliable transmission of the data, a target error rate may be configured between the first device 110 and the second device 120. In some embodiments, the target error rate may be any type of error rate to be achieved, which can reflect a target transmission reliability of the data. For example, the target error rate may include a target bit error rate (BER), a target block error rate (BLER), a target frame error rate (FER), a target symbol error rate (SER), or the like. In the following, the target BLER is taken as an example of the target error rate to describe some embodiments of the present disclosure. However, it is to be understood that these embodiments are equally applicable to other possible types of target error rate. It is also noted that the target error rate used in some embodiments of the present disclosure is a variable (or dynamic) target error rate instead of a fixed preset target error rate, as described in more detail hereinafter.

In transmitting the data to the second device 120, the first device 110 may code the data first, so as to for example enhance the reliability of the transmission of the data. For performing the coding of the data, the first device 110 may determine a code rate for the coding. In telecommunication and information theory, the code rate (or information rate) of a coding approach, such as a forward error correction code, generally refers to the proportion of the useful (non-redundant) data. That is, if the code rate is k/n, for every k bits of useful information, the coder generates a total of n bits of data, of which n-k are redundant. In simple words, the code rate can be defined as how effectively data can be transmitted in a transport block (such as, 1 ms) or in other words, it is the ratio of actual amount of bits transmitted to the maximum amount of bits that could be transmitted in one transport block.

In some embodiments, the code rate determined by the first device 110 may be associated with a modulation and coding scheme (MCS) of a particular index, as defined in 3GPP specifications. In other word, for determining the code rate for coding the data before transmission, the first device 110 may select a MCS of a particular index from all the available MCSs with various indexes, such as 0-31, as defined in 3GPP specifications.

As indicated above, in various communication scenarios such as the MuLTEfire system, a variable target error rate instead of a fixed target error rate may be desirable for better performance of communication. In such a case, since the target error rate may be dynamic, the first device 110 can determine the code rate based on the dynamic target error rate, so as to enable the determined code rate to accommodate the variable target error rate. For example, the determined code rate can ensure that the actual error rate between the first device 110 and the second device 120 is always below the variable target error rate. In some embodiments, this helps the first device 110 and the second device 120 realize an OLLA compatible with a variable target error rate.

In the following, an example way for the first device 110 determining the code rate based on the target error rate is described. It is to be understood that, in some other embodiments, the first device 110 may utilize any suitable manner to determine an appropriate code rate based on the target error, and the scope of the present disclosure is not limited in this regard.

In the example way for determining the code rate based on the target error rate, the first device 110 may obtain a measured value of quality of the channel 115 for transmitting the data from the second device 120 to the first device 110. For example, the first device 110 may measure the SNR of the channel 115 by itself through some reference signals transmitted by the second device 120. As another example, the first device 110 may obtain the measured value of quality from a channel quality indicator reported by the second device 120. This may be the case that the channel 115 is a downlink channel, for example. However, it is appreciated that the first device 110 may obtain the measured value by any appropriate means, and the scope of the present disclosure is not limited in this regard.

Upon obtaining the measured value of quality of the channel 115, the first device 110 may adjust the measured value of quality based on the target error rate. This adjustment of the measured value of quality is to overcome non-ideal measurements and channel conditions, for example. It is noted that since the target error rate may be variable or dynamic, the adjustment can also be variable or dynamic over a plurality of transmissions between the first device 110 and the second device 120.

To make the adjustment variable with the dynamic target error rate, the first device 110 may employ a dynamic offset for adjusting the measured value of quality, which offset may be adjusted based on the variable target error rate. For example, the first device 110 may determine an offset based on the target error rate and a previous offset associated with previous transmission from the second device 120 to the first device 110. That is, the current offset is obtaining by adjusting the previous offset. The first device 110 may then increase the measured value of quality by the determined current offset. In this way, the impact of non-ideal measurements and channel conditions may be reduced or eliminated.

In some embodiments, the determination of the offset for the measured value of quality may be based on a HARQ result for the previous transmission determined by the first device 110, so as to perform an outer loop link adaption to improve communication performance over a plurality of transmissions. For example, if the first device 110 determines a NACK for the previous transmission, the first device 110 may decrease the previous offset by a predetermined first step size. On the other hand, if the first device 110 determines an ACK for the previous transmission, the first device 110 may alternatively increase the previous offset by a second step size, and the second step size is determined based on the target error rate. The second step size varying with the dynamic target error rate allows the offset for the measured value of quality to accommodate the target error rate. It is understood that if the data transmission is downlink transmission from the network device 110 to the terminal device 120, the HARQ result for the previous transmission may alternatively be received at the network device 110 from the terminal device 120.

As an example, the second step size may be determined as $$\text{StepSize} \cdot \frac{BLER_{target\_t}}{1 - BLER_{target\_t}},$$

wherein StepSize represents the first step size, and $BLER_{target\_t}$ represents a target block error rate between the first device 110 and the second device 120. Therefore, when a HARQ result for a previous transmission is determined at the first device 110, the first device 110 may calculate the current offset according to the equation (3) as below, based on an determined ACK or a NACK:

$$\Delta_{current} = \begin{cases} \Delta_{previous} - \text{StepSize} & (NACK \text{ is determined}) \\ \Delta_{previous} + \text{StepSize} \cdot \frac{BLER_{target\_t}}{1-BLER_{target\_t}} & (ACK \text{ is determined}) \end{cases} \quad (3)$$

It is noted that $BLER_{target\_t}$ represents the BLER target of this transmission, which is variable over a plurality of different transmissions. Then, the first device 110 may adjust the measured value of quality by increasing the measured value of quality by the current offset. In this way, the current offset for adjusting the measured value of quality of the channel may account for the potential variations in the target error rate.

After adjusting the measured value of quality based on the target error rate, the first device 110 may obtain the code rate for transmitting the data, based on the adjusted value of quality. For example, the first device 110 may determine the code rate so as to ensure that the transmission of the data has the adjusted value of quality. In some embodiments, there may be a mapping between values of the code rate and values of quality of the channel, such that the first device 110 may determine a particular code rate corresponding to the adjusted value of quality. In some embodiments, values of the code rate may be associated with MCSs of different indexes, and there may be a mapping between the indexes of MCSs and values of quality of the channel. In this way, the determined code rate for transmitting the data is optimized according to both the measured value of quality and the target error rate, such that the determined code rate may be more reasonable for the transmission.

At block 220, the first device 110 adjusts the code rate based on an amount of the data and an amount of resource available for transmitting the data. As discussed above, in some communication scenarios such as in the MuLTEfire system, the first device 110 may be allocated more resource for transmitting the coded data than that is needed to transmit the data at an acceptable error rate. In other words, for the coded data after the data is coded with the determined code rate, the amount of resource available for the first device 110 to transmit the coded data may be greater than the amount of resource necessary to transmit the coded data at an acceptable error rate, such as the target error rate.

In this event, in order to prevent from wasting the available resource, the first device 110 may select a most robust code rate for transmitting the data. That is, the first device 110 may reduce the determined code rate to adapt the amount of the coded data at the reduced code rate to the amount of resource. With the adjusted the code rate, the transfer block can still accommodate the data of the first device 110 to be transmitted, while lowering the latency of data transmission by decreasing the probability of HARQ retransmission opportunity. Meanwhile, the amount of available transmission resource is fully utilized without waste.

It is to be understood that the code rate may also be increased by the first device 110 based on an amount of the data and an amount of resource available for transmitting the data. For example, this may be the case that the amount of resource available for transmitting the data is less than the amount of resource necessary to transmit the data from the second device 120 to the first device 110. In this event, the code rate may be increased at the cost of possibly lowering the reliability of the transmission.

Figure 3:
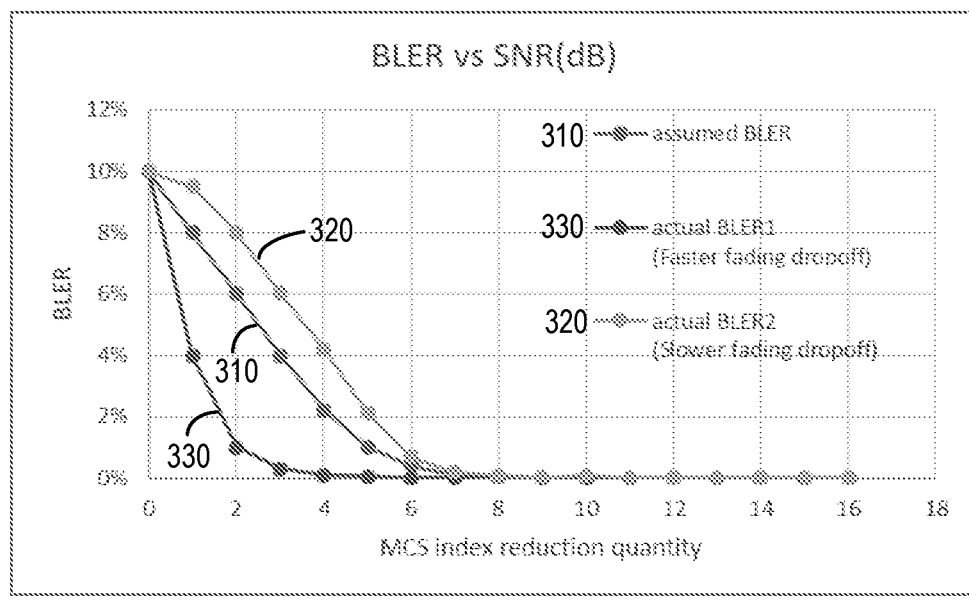
FIG. 3 shows an example of the BLER deviation between an assumed BLER and an actual BLER for slow and fast fading channel conditions in accordance with some embodiments of the present disclosure.

In addition, the inventors find that the error rate gain (such as the BLER gain) brought by the adjusting of the code rate (such as the MCS reduction performed in the MuLTEfire) depends on the amount of the adjustment of the code rate (such as the MCS reduction level in the MuLTEfire) as well as the channel condition. FIG. 3 shows an example 300 of the BLER deviation between an assumed BLER and an actual BLER for slow and fast fading channel conditions in accordance with some embodiments of the present disclosure. In FIG. 3, the horizontal axis represents the MCS index reduction quantity and the vertical axis represents the BLER in percentage. As shown, the assumed BLER 310 have a certain degree of inconsistence with the actual BLER 320 in a wireless channel with a slower fading dropoff and the actual BLER 330 in a wireless channel with a faster fading dropoff.

As the real channel condition is unknown in a practical system, the deviation error between the assumed BLER and the actual BLER is hard to be accurately estimated with limited number of error rate (such as BLER) vs adjustment of code rate (such as MCS reduction) assumptions. Therefore, to mitigate the impact of the deviation between the target error rate and an actual error rate due to a fading channel condition, a fading compensation factor may be applied by the first device 110 to adjust the measured value of quality of the channel 115, in order to lower the contribution of ACKs and NACKs when the code rate is adjusted (for example, the MCS is reduced) and to compensate the potential deviation error.

In some embodiments, the first device 110 may determine the fading compensation factor based on the amount of the adjustment of the code rate. Then, the first device 110 may use the fading compensation factor to adjust the first and second step sizes in the above equation (3), to compensate deviation between the target error rate and an actual error rate due to a fading channel condition.

For example, if the code rate is associated with a modulation and coding scheme (MCS) of a first index and the adjusted code rate is associated with a MCS of a second index, the amount of the adjustment of the code rate may be represented by an index difference between the first and second indexes. In this event, the first device 110 may retrieve the fading compensation factor from a mapping based on the index difference, which mapping indicates associations between values of index differences and values of fading compensation factors. In this manner, the first device 110 may obtain the fading compensation factor in a simple and convenient way.

In other words, in case that the MCS index determined based on the target error rate is reduced based on an amount of the data and an amount of resource available for transmitting the data, the value of fading compensation factor may depend on the value of the MCS reduction level. Below is an example mapping in which an exponential fading compensation factor is used, that is, the values of the fading compensation factor are exponential function of the MCS index difference (for example, the MCS reduction level). It is to be understood that the specific numerals and mapping relations shown in the table are merely examples, without any suggestion of limitation on the present disclosure. In other embodiments, other tables with other appropriate numerals and mapping relations may also be used.

| MCS index difference | Fading Compensation Factor |
| --- | --- |
| 0 | 1 |
| 1 | 1/2 |
| 2 | 1/4 |
| 3 | 1/8 |
| 4 | 1/16 |
| 5 | 1/32 |
| 6 | 1/64 |
| 7 | 1/128 |
| 8 | 1/256 |
| 9 | 1/512 |
| 10 | 1/1024 |
| >10 | 1/2048 |

With the fading compensation factor, the above equation (3) may be updated to equation (4) as shown below:

$$\Delta_{current} = \begin{cases} \Delta_{previous} - StepSize \cdot Factor_{fading} & (NACK \text{ is determined}) \\ \Delta_{previous} + StepSize \cdot \dfrac{BLER_{target\_t}}{1 - BLER_{target\_t}} \cdot Factor_{fading} & (ACK \text{ is determined}) \end{cases} \quad (4)$$

where $Factor_{fading}$ represents the fading compensation factor of current transmission.

According to this equation, in determining the current offset $\Delta_{current}$, the first device 110 may load the amount of the adjustment of the code rate, calculate the $BLER_{target\_t}$ and the $Factor_{fading}$ for current transmission. Upon determining the HARQ result of the previous transmission, the first device 110 may calculate $\Delta_{current}$ according to equation (4). For the purpose of determining the current offset $\Delta_{current}$, the first device 110 may store the amount of the adjustment of the code rate, after the initial code rate and the adjusted code rate are calculated.

At block 230, after transmitting the coded data at the adjusted code rate, the first device 110 updates the target error rate for transmitting subsequent data from the second device 120 to the first device 110 based on an amount of the adjustment of the code rate. In other words, the first device 110 will use the updated the target error rate to perform the subsequent data transmission from the second device 120 to the first device 110. Through updating the target error rate according to the amount of the adjustment of the code rate, the first device 110 may ensure that the actual error rate is below the target error rate and the deviation between the target error rate and an actual error rate is corrected, through a plurality of transmissions.

As discussed above, in some embodiments, the code rate may be associated with a MCS of a first index and the adjusted code rate may be associated with a MCS of a second index. Thus, the amount of the adjustment of the code rate may be represented by an index difference between the first and second indexes. In these embodiments, the first device 110 may retrieve the updated target error rate from a mapping based on the index difference, which mapping indicates associations between values of index differences and values of target error rates. In this manner, the first device 110 may obtain the updated target error rate in a simple and convenient way. As an example, the mapping may be represented by the following table.

| MCS index difference | Target BLER |
| --- | --- |
| 0 | 10% |
| 1 | 8% |
| 2 | 6% |
| 3 | 4% |
| 4 | 2% |
| 5 | 1% |
| 6 | 0.4% |
| 7 | 0.10% |
| 8 | 0.04% |
| >8 | 0.01% |

As can be seen in the table, a preset BLER target may be defined for no MCS adjustment (such as MCS reduction) case, which is 10% in the example table. For each MCS adjustment level, a corresponding BLER target is defined. The value can be from simulation result. The first device 110 may get the BLER target from the table according to MCS adjustment level of the current transmission. It is to be understood that the specific numerals and mapping relations shown in the table are merely examples, without any suggestion of limitation on the present disclosure. In other embodiments, other tables with other appropriate numerals and mapping relations may also be used.

In some embodiments, an apparatus for performing the method 200 (for example, the network device 110 and the terminal devices 120, 130, 140) may comprise respective means for performing the corresponding steps in the method 200. These means may be implemented in any suitable manners. For example, it can be implemented by circuitry or software modules or a combination thereof.

In some embodiments, the apparatus comprises: means for determining, based on a target error rate between a first device and a second device, a code rate for transmitting data from the second device to the first device; means for adjusting the code rate based on an amount of the data and an amount of resource available for transmitting the data; and means for updating the target error rate for transmitting subsequent data from the second device to the first device based on an amount of the adjustment of the code rate.

In some embodiments, the means for determining the code rate comprises: means for obtaining a measured value of quality of a channel for transmitting the data from the second device to the first device; means for adjusting the measured value of quality based on the target error rate; and means for obtaining the code rate based on the adjusted value of quality.

In some embodiments, the means for adjusting the measured value of quality comprises: means for determining an offset based on the target error rate and a previous offset associated with previous transmission from the second device to the first device; and means for increasing the measured value of quality by the offset.

In some embodiments, the means for determining the offset comprises: means for in response to determining a NACK for the previous transmission, decreasing the previous offset by a predetermined first step size; and means for in response to determining an ACK for the previous transmission, increasing the previous offset by a second step size, the second step size determined based on the target error rate.

In some embodiments, the second step size is determined as $$StepSize \cdot \frac{BLER_{target\_t}}{1-BLER_{target\_t}},$$

wherein StepSize represents the first step size, and $BLER_{target\_t}$ represents a target block error rate between the first device and the second device.

In some embodiments, the apparatus further comprises: means for determining a fading compensation factor based on the amount of the adjustment of the code rate; and means for adjusting the first and second step sizes with the fading compensation factor, to compensate deviation between the target error rate and an actual error rate due to a fading channel condition.

In some embodiments, the code rate is associated with a modulation and coding scheme (MCS) of a first index, the adjusted code rate is associated with a MCS of a second index, the amount of the adjustment of the code rate is represented by an index difference between the first and second indexes, and the fading compensation factor is retrieved from a mapping based on the index difference, the mapping indicating associations between values of index differences and fading compensation factors.

In some embodiments, the mapping comprises the following table:

| MCS index difference | Fading Compensation Factor |
| --- | --- |
| 0 | 1 |
| 1 | 1/2 |
| 2 | 1/4 |
| 3 | 1/8 |
| 4 | 1/16 |
| 5 | 1/32 |
| 6 | 1/64 |
| 7 | 1/128 |
| 8 | 1/256 |
| 9 | 1/512 |
| 10 | 1/1024 |
| >10 | 1/2048 |

In some embodiments, the means for adjusting the code rate comprises: means for reducing the code rate to adapt an amount of the coded data at the reduced code rate to the amount of resource.

In some embodiments, the code rate is associated with a MCS of a first index, the adjusted code rate is associated with a MCS of a second index, the amount of the adjustment of the code rate is represented by an index difference between the first and second indexes, and the updated target error rate is retrieved from a mapping based on the index difference, the mapping indicating associations between values of index differences and target error rates.

In some embodiments, the mapping comprises the following table:

| MCS index difference | Target BLER |
| --- | --- |
| 0 | 10% |
| 1 | 8% |
| 2 | 6% |
| 3 | 4% |

-continued

| MCS index difference | Target BLER |
|---|---|
| 4 | 2% |
| 5 | 1% |
| 6 | 0.4% |
| 7 | 0.10% |
| 8 | 0.04% |
| >8 | 0.01% |

In some embodiments, one of the first and second devices comprises a network device and the other one of the first and second devices comprises a terminal device.

In some embodiments, the apparatus operates in a MuLTEfire system.

Figure 4:
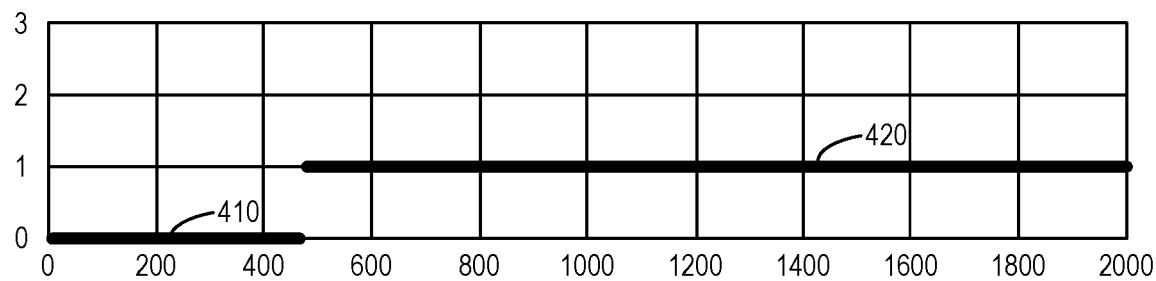
FIG. 4 shows a simulation result in accordance with a conventional outer loop link adaption scheme.

FIG. 4 shows a simulation result 400 in accordance with a conventional outer loop link adaption scheme. In the simulation, the MCS deviation between the simulated MCS index obtained by the conventional outer loop link adaption scheme and the reasonable MCS index to be corrected is set to be +2, the MCS reduction ratio is set to be 90%, and the MCS reduction level is set as random. In the figure, the simulated MCS index obtained by the conventional outer loop link adaption scheme is denoted as 410 and 420, the reasonable MCS index is 2, the horizontal axis represents the number of transmissions, and the vertical axis represents the MCS deviation.

As shown by 410 and 420, for transmission 0 to approximately transmission 480, the simulated MCS deviation obtained by the conventional outer loop link adaption scheme is zero, and for transmission approximately 481 to transmission 2000, the simulated MCS deviation obtained by the conventional outer loop link adaption scheme is corrected to be one. That is, the conventional outer loop link adaption scheme only achieves a correction of 1 MCS level after 2000 UL transmissions. It can be seen that, with existing OLLA scheme where corrections are only made on MCS values that are not reduced, the corrections occur much more slowly. The major reason is that existing method uses fixed BLER target and does not consider the impact of MCS reduction.

Figure 5:
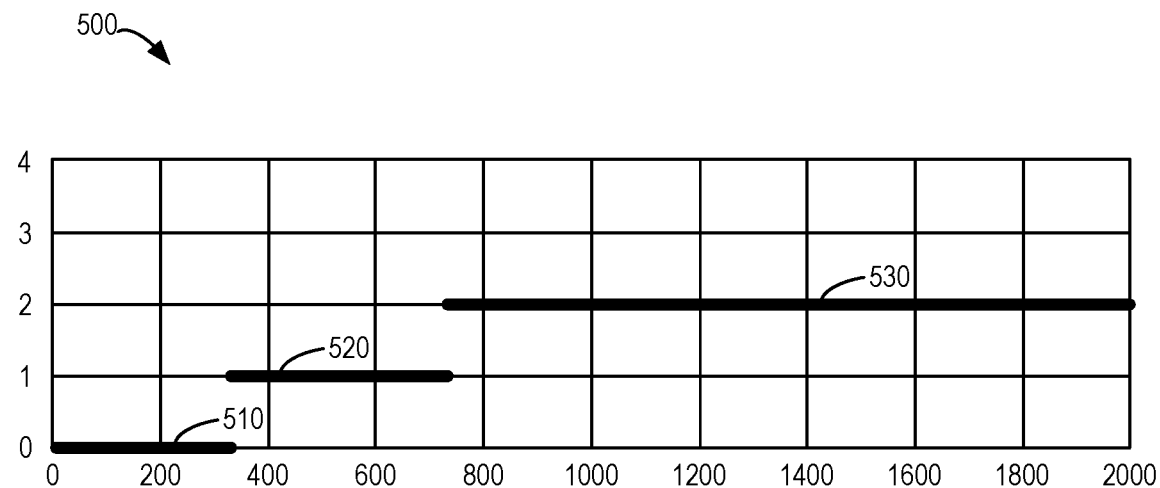
FIG. 5 shows a simulation result in accordance with some embodiments of the present disclosure.

FIG. 5 shows a simulation result 500 in accordance with some embodiments of the present disclosure. In the simulation, the MCS deviation between the simulated MCS index obtained by the embodiments of the present disclosure and the reasonable MCS index to be corrected is set to be +2, the MCS reduction ratio is set to be 90%, and the MCS reduction level is set as random. In the figure, the simulated MCS index obtained by the embodiments of the present disclosure is denoted as 510, 520 and 530, the reasonable MCS index is 2, the horizontal axis represents the number of transmissions, and the vertical axis represents the MCS deviation.

As shown by 510, 520 and 530, for transmission 0 to approximately transmission 300, the simulated MCS deviation obtained by the embodiments of the present disclosure is zero, for transmission approximately 301 to approximately transmission 750, the simulated MCS deviation obtained by the embodiments of the present disclosure is corrected to be one, and for transmission approximately 751 to transmission 2000, the simulated MCS deviation obtained by the embodiments of the present disclosure is corrected to be two.

It can be seen that the embodiments of the present disclosure achieve the correct MCS offset after 750 transmissions, which is much faster compared to the simulation result of the conventional outer loop link adaption scheme of FIG. 4. In other words, with the embodiments of the present disclosure, the majority of OLLA MCS correction is 2 which is right value for the MCS deviation. The reason is that the embodiments of the present disclosure consider the impact of MCS reduction and uses dynamic BLER target. Moreover, the embodiments of the present disclosure are robust in various channel conditions, which is mainly due to the purposely designed fractional fading compensation factor.

Embodiments of the present disclosure also provide a method for determining whether the proposed link adaption scheme according to some embodiments of the present disclosure has been used. The method may comprise the following operations. It is to be understood that all the specific terms and numerals are only for the purpose of example, without any limitations to the present disclosure.

In the first operation, a UL data transfer from a fixed location (or cabled if this is possible) using a UL data rate is performed, which allows N interlaces to be filled with minimum padding (say 2 interlaces). The UL MCS and BLER are recorded over time and how long it takes to reach a consistent MCS and BLER (expect around 10%) is measured.

In the second operation, the terminal device is re-attached and the UL data rate is slightly increased so the assigned number of interlaces is increased by one. The reason for re-attaching the terminal device is to erase the OLLA correction from the first operation. If the MCS is the same, then MCS reduction is not supported. This means that the proposed link adaption scheme is not applicable. If the MCS is lowered, then the MCS reduction is supported, and the third operation is performed and checked.

In the third operation, the UL data rate is immediately dropped to a value used in the first operation (without re-attach) such that the reduced MCS is not used. If the UL MCS is the same as the steady value in the first operation, then the improved link adaption scheme as proposed herein is used where the OLLA corrections are applied during UL allocations using reduced MCS. If the UL MCS (and the BLER) is different than the steady value in the first operation, then the proposed link adaption scheme is not used.

Figure 6:
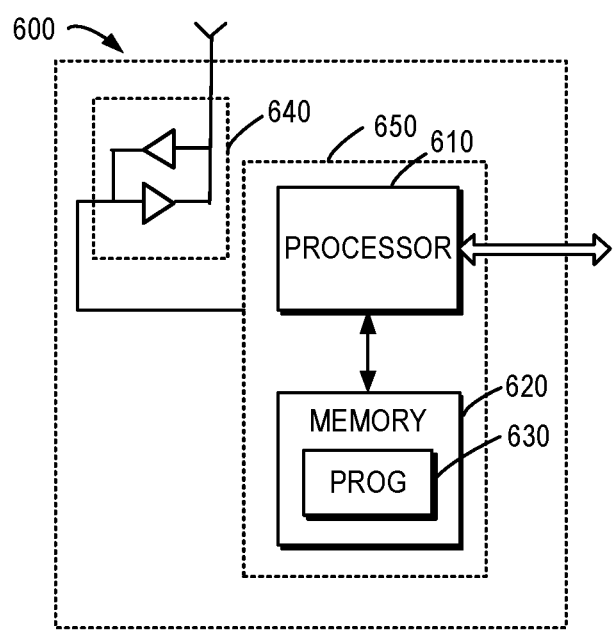
FIG. 6 is a simplified block diagram of a device that is suitable for implementing embodiments of the present disclosure.

FIG. 6 is a simplified block diagram of a device 600 that is suitable for implementing embodiments of the present disclosure. The device 600 can be considered as a further example embodiment of the network device 110 and the terminal devices 120, 130, and 140 as shown in FIG. 1. Accordingly, the device 600 can be implemented at or as at least a part of the network device 110 or the terminal device 120, 130, and 140.

As shown, the device 600 includes a processor 610, a memory 620 coupled to the processor 610, a suitable transmitter (TX) and receiver (RX) 640 coupled to the processor 610, and a communication interface coupled to the TX/RX 640. The memory 620 stores at least a part of a program 630. The TX/RX 640 is for bidirectional communications. The TX/RX 640 has at least one antenna to facilitate communication. The communication interface may represent any interface that is necessary for communication with other network elements, such as X2 interface for bidirectional communications between eNBs, S1 interface for communication between a Mobility Management Entity (MME)/Serving Gateway (S-GW) and the eNB, Un interface for communication between the eNB and a relay node (RN), or Uu interface for communication between the eNB and a terminal device.

The program 630 is assumed to include program instructions that, when executed by the associated processor 610, enable the device 600 to operate in accordance with the embodiments of the present disclosure, as discussed herein with reference to FIGS. 1 to 6. The embodiments herein may be implemented by computer software executable by the processor 610 of the device 600, or by hardware, or by a combination of software and hardware. The processor 610 may be configured to implement various embodiments of the present disclosure. Furthermore, a combination of the processor 610 and memory 620 may form processing means 650 adapted to implement various embodiments of the present disclosure.

The memory 620 may be of any type suitable to the local technical network and may be implemented using any suitable data storage technology, such as a non-transitory computer readable storage medium, semiconductor based memory devices, magnetic memory devices and systems, optical memory devices and systems, fixed memory and removable memory, as non-limiting examples. While only one memory 620 is shown in the device 600, there may be several physically distinct memory modules in the device 600. The processor 610 may be of any type suitable to the local technical network, and may include one or more of general purpose computers, special purpose computers, microprocessors, digital signal processors (DSPs) and processors based on multicore processor architecture, as non-limiting examples. The device 600 may have multiple processors, such as an application specific integrated circuit chip that is slaved in time to a clock which synchronizes the main processor.

The components included in the apparatuses and/or devices of the present disclosure may be implemented in various manners, including software, hardware, firmware, or any combination thereof. In one embodiment, one or more units may be implemented using software and/or firmware, for example, machine-executable instructions stored on the storage medium. In addition to or instead of machine-executable instructions, parts or all of the units in the apparatuses and/or devices may be implemented, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), and the like.

Generally, various embodiments of the present disclosure may be implemented in hardware or special purpose circuits, software, logic or any combination thereof. Some aspects may be implemented in hardware, while other aspects may be implemented in firmware or software which may be executed by a controller, microprocessor or other computing device. While various aspects of embodiments of the present disclosure are illustrated and described as block diagrams, flowcharts, or using some other pictorial representation, it will be appreciated that the blocks, apparatus, systems, techniques or methods described herein may be implemented in, as non-limiting examples, hardware, software, firmware, special purpose circuits or logic, general purpose hardware or controller or other computing devices, or some combination thereof.

The present disclosure also provides at least one computer program product tangibly stored on a non-transitory computer readable storage medium. The computer program product includes computer-executable instructions, such as those included in program modules, being executed in a device on a target real or virtual processor, to carry out the process or method as described above with reference to any of FIG. 2. Generally, program modules include routines, programs, libraries, objects, classes, components, data structures, or the like that perform particular tasks or implement particular abstract data types. The functionality of the program modules may be combined or split between program modules as desired in various embodiments. Machine-executable instructions for program modules may be executed within a local or distributed device. In a distributed device, program modules may be located in both local and remote storage media.

Program code for carrying out methods of the present disclosure may be written in any combination of one or more programming languages. These program codes may be provided to a processor or controller of a general purpose computer, special purpose computer, or other programmable data processing apparatus, such that the program codes, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

The above program code may be embodied on a machine readable medium, which may be any tangible medium that may contain, or store a program for use by or in connection with an instruction execution system, apparatus, or device. The machine readable medium may be a machine readable signal medium or a machine readable storage medium. A machine readable medium may include but not limited to an electronic, magnetic, optical, electromagnetic, infrared, or semiconductor system, apparatus, or device, or any suitable combination of the foregoing. More specific examples of the machine readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

For the purpose of the present disclosure as described herein above, it should be noted that, method steps likely to be implemented as software code portions and being run using a processor at a network element or terminal (as examples of devices, apparatuses and/or modules thereof, or as examples of entities including apparatuses and/or modules therefore), are software code independent and can be specified using any known or future developed programming language as long as the functionality defined by the method steps is preserved;

generally, any method step is suitable to be implemented as software or by hardware without changing the idea of the invention in terms of the functionality implemented;

method steps and/or devices, units or means likely to be implemented as hardware components at the above-defined apparatuses, or any module(s) thereof, (e.g., devices carrying out the functions of the apparatuses according to the embodiments as described above, eNode-B etc. as described above) are hardware independent and can be implemented using any known or future developed hardware technology or any hybrids of these, such as MOS (Metal Oxide Semiconductor), CMOS (Complementary MOS), BiMOS (Bipolar MOS), BiCMOS (Bipolar CMOS), ECL (Emitter Coupled Logic), TTL (Transistor-Transistor Logic), etc., using for example ASIC (Application Specific IC (Integrated Circuit)) components, FPGA (Field-programmable Gate Arrays) components, CPLD (Complex Programmable Logic Device) components or DSP (Digital Signal Processor) components;

devices, units or means (e.g. the above-defined apparatuses, or any one of their respective means) can be implemented as individual devices, units or means, but this does not exclude that they are implemented in a distributed fashion throughout the system, as long as the functionality of the device, unit or means is preserved;

an apparatus may be represented by a semiconductor chip, a chipset, or a (hardware) module comprising such chip or chipset; this, however, does not exclude the possibility that a functionality of an apparatus or module, instead of being hardware implemented, be implemented as software in a (software) module such as a computer program or a computer program product comprising executable software code portions for execution/being run on a processor;

a device may be regarded as an apparatus or as an assembly of more than one apparatus, whether functionally in cooperation with each other or functionally independently of each other but in a same device housing, for example.

It is noted that the embodiments and examples described above are provided for illustrative purposes only and are in no way intended that the present disclosure is restricted thereto. Rather, it is the intention that all variations and modifications be included which fall within the spirit and scope of the appended claims.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific embodiment details are contained in the above discussions, these should not be construed as limitations on the scope of the present disclosure, but rather as descriptions of features that may be specific to particular embodiments. Certain features that are described in the context of separate embodiments may also be implemented in combination in a single embodiment. Conversely, various features that are described in the context of a single embodiment may also be implemented in multiple embodiments separately or in any suitable sub-combination.

Although the present disclosure has been described in language specific to structural features and/or methodological acts, it is to be understood that the present disclosure defined in the appended claims is not necessarily limited to the specific features or acts described above. Rather, the specific features and acts described above are disclosed as example forms of implementing the claims.

What is claimed is:

1. A method for communication, comprising:
    determining, based on a target error rate between a first device and a second device, a code rate for transmitting data from the second device to the first device;
    adjusting the code rate based on an amount of the data and an amount of resource available for transmitting the data; and
    updating the target error rate for transmitting subsequent data from the second device to the first device based on an amount of the adjustment of the code rate.

2. The method of claim 1, wherein determining the code rate comprises:
    obtaining a measured value of quality of a channel for transmitting the data from the second device to the first device;
    adjusting the measured value of quality based on the target error rate; and obtaining the code rate based on the adjusted value of quality.

3. The method of claim 2, wherein adjusting the measured value of quality comprises:
    determining an offset based on the target error rate and a previous offset associated with previous transmission from the second device to the first device; and
    increasing the measured value of quality by the offset.

4. The method of claim 3, wherein determining the offset comprises:
    in response to determining a negative acknowledgement for the previous transmission, decreasing the previous offset by a predetermined first step size; and
    in response to determining an acknowledgement for the previous transmission, increasing the previous offset by a second step size, the second step size determined based on the target error rate.

5. The method of claim 4, wherein the second step size is determined as $$\text{StepSize} \cdot \frac{BLER_{target\_t}}{1 - BLER_{target\_t}},$$

wherein StepSize represents the first step size, and $BLER_{target\_t}$ represents a target block error rate between the first device and the second device.

6. The method of claim 4, further comprising:
    determining a fading compensation factor based on the amount of the adjustment of the code rate; and
    adjusting the first and second step sizes with the fading compensation factor, to compensate deviation between the target error rate and an actual error rate due to a fading channel condition.

7. The method of claim 6, wherein the code rate is associated with a modulation and coding scheme of a first index and the adjusted code rate is associated with a modulation and coding scheme of a second index,
    wherein the amount of the adjustment of the code rate is represented by an index difference between the first and second indexes, and
    wherein the fading compensation factor is retrieved from a mapping based on the index difference, the mapping indicating associations between values of index differences and fading compensation factors.

8. The method of claim 1, wherein adjusting the code rate comprises: reducing the code rate to adapt an amount of the coded data at the reduced code rate to the amount of resource.

9. The method of claim 1, wherein the code rate is associated with a modulation and coding scheme of a first index and the adjusted code rate is associated with a modulation and coding scheme of a second index,
    wherein the amount of the adjustment of the code rate is represented by an index difference between the first and second indexes, and wherein the updated target error rate is retrieved from a mapping based on the index difference, the mapping indicating associations between values of index differences and target error rates.

10. The method of claim 1, wherein one of the first and second devices comprises a network device and the other one of the first and second devices comprises a terminal device.

11. The method of claim 1, wherein the method is performed in a MuLTEfire system.

12. A device, comprising:
at least one processor; and
at least one memory storing computer program code;
the at least one memory and the computer program code being configured to, with the at least one processor, cause the device to:
determine, based on a target error rate between the device and a further device, a code rate for transmitting data from the further device to the device;
adjust the code rate based on an amount of the data and an amount of resource available for transmitting the data; and
update the target error rate for transmitting subsequent data from the further device to the device based on an amount of the adjustment of the code rate.

13. The device of claim 12, wherein the at least one memory and the computer program code are further configured to, with the at least one processor, cause the device to:
obtain a measured value of quality of a channel for transmitting the data from the further device to the device;
adjust the measured value of quality based on the target error rate; and
obtain the code rate based on the adjusted value of quality.

14. The device of claim 13, wherein the at least one memory and the computer program code further configured to, with the at least one processor, cause the device to:
determine an offset based on the target error rate and a previous offset associated with previous transmission from the further device to the device; and
increase the measured value of quality by the offset.

15. The device of claim 14, wherein the at least one memory and the computer program code are further configured to, with the at least one processor, cause the device to:
in response to determining a negative acknowledgement for the previous transmission, decrease the previous offset by a predetermined first step size; and
in response to determining an acknowledgement for the previous transmission, increase the previous offset by a second step size, the second step size determined based on the target error rate.

16. The device of claim 15, wherein the second step size is determined as $$\text{StepSize} \cdot \frac{BLER_{target\_t}}{1 - BLER_{target\_t}},$$

wherein StepSize represents the first step size, and $BLER_{target\_t}$ represents a target block error rate between the device and the further device.

17. The device of claim 15, wherein the at least one memory and the computer program code are further configured to, with the at least one processor, cause the device to:
determine a fading compensation factor based on the amount of the adjustment of the code rate; and
adjust the first and second step sizes with the fading compensation factor, to compensate deviation between the target error rate and an actual error rate due to a fading channel condition.

18. The device of claim 17, wherein the code rate is associated with a modulation and coding scheme of a first index and the adjusted code rate is associated with a modulation and coding scheme of a second index,
wherein the amount of the adjustment of the code rate is represented by an index difference between the first and second indexes, and
wherein the fading compensation factor is retrieved from a mapping based on the index difference, the mapping indicating associations between values of index differences and fading compensation factors.

19. The device of claim 12, wherein the at least one memory and the computer program code are further configured to, with the at least one processor, cause the device to:
reduce the code rate to adapt an amount of the coded data at the reduced code rate to the amount of resource.

20. The device of claim 12, wherein the code rate is associated with a modulation and coding scheme of a first index and the adjusted code rate is associated with a modulation and coding scheme of a second index,
wherein the amount of the adjustment of the code rate is represented by an index difference between the first and second indexes, and
wherein the updated target error rate is retrieved from a mapping based on the index difference, the mapping indicating associations between values of index differences and target error rates.

21. The device of claim 12, wherein one of the device and the further device comprises a network device and the other one of the device and the further device comprises a terminal device.

22. The device of claim 12, wherein the device operates in a MuLTEfire system.

23. A non-transitory computer readable medium comprising program instructions for causing an apparatus to perform at least the following:
determining, based on a target error rate between a first device and a second device, a code rate for transmitting data from the second device to the first device;
adjusting the code rate based on an amount of the data and an amount of resource available for transmitting the data; and
updating the target error rate for transmitting subsequent data from the second device to the first device based on an amount of the adjustment of the code rate.

* * * * *